(12) United States Patent
El Haloui et al.

(10) Patent No.: US 11,686,213 B2
(45) Date of Patent: Jun. 27, 2023

(54) HEALTH MONITORING BASED ON BLADE TIP TRAJECTORY

(71) Applicant: Ratier-Figeac SAS, Figeac (FR)

(72) Inventors: Abdellah El Haloui, Figeac (FR); Arnaud Bouchet, Planioles (FR)

(73) Assignee: RATIER-FIGEAC SAS, Figeac (FR)

( * ) Notice: Subject to any disclaimer, the term of this patent is extended or adjusted under 35 U.S.C. 154(b) by 206 days.

(21) Appl. No.: 17/166,121

(22) Filed: Feb. 3, 2021

(65) Prior Publication Data

US 2021/0254497 A1    Aug. 19, 2021

(30) Foreign Application Priority Data

Feb. 19, 2020  (EP) .................................... 20305160

(51) Int. Cl.
*F01D 21/00* (2006.01)
*B64C 11/16* (2006.01)
*B64D 15/12* (2006.01)
*B64D 45/00* (2006.01)
*B64D 47/02* (2006.01)
(Continued)

(52) U.S. Cl.
CPC ............ *F01D 21/003* (2013.01); *B64C 11/16* (2013.01); *B64D 15/12* (2013.01); *B64D 45/00* (2013.01); *B64D 47/02* (2013.01); *B64F 5/00* (2013.01); *G01M 5/0016* (2013.01); *G01M 5/0041* (2013.01); *B64D 2045/0085* (2013.01)

(58) Field of Classification Search
CPC ..... F01D 21/003; B64C 11/16; B64C 27/463; B64C 11/001; B64C 11/00; B64D 15/12; B64D 45/00; B64D 47/02; B64D 2045/0085; B64D 2203/00; B64F 5/00; B64F 5/60; G01M 5/0016; G01M 5/0041; Y02T 50/60

See application file for complete search history.

(56) References Cited

U.S. PATENT DOCUMENTS 4,060,212 A * 11/1977 Magenheim ............. H05B 6/80
                                                        219/703
7,824,147 B2    11/2010 Morris et al.
(Continued)

OTHER PUBLICATIONS

Extended European Search Report for International Application No. 20305160.2 dated Aug. 18, 2020, 7 pages.
(Continued)

*Primary Examiner* — Loren C Edwards
*Assistant Examiner* — Edward Bushard
(74) *Attorney, Agent, or Firm* — Cantor Colburn LLP

(57) ABSTRACT

A propeller health monitoring system for an aircraft includes an aircraft having one or more propellers that includes light in or on them. The system includes one or more receptors mounted to a fuselage or a nacelle of the aircraft, each receptor having a sensor surface which is able to detect a position for each light beam crossing over the sensor surface as the propeller rotates, such that the receptor generates a signal that is indicative of the position as a measure of blade tip trajectory for each passing propeller blade The system also includes a processing unit which analyses the signals from the receptor to determine health of the propeller blades of the one or more propellers based on where the beams of light from the propeller blades have crossed over the sensor surface.

16 Claims, 4 Drawing Sheets

(51) Int. Cl.
*B64F 5/00* (2017.01)
*G01M 5/00* (2006.01)

(56) References Cited

U.S. PATENT DOCUMENTS

| | | |
|---|---|---|
| 9,599,711 B2 | 3/2017 | Lilly et al. |
| 9,995,167 B2 | 6/2018 | Shepard |
| 2008/0225536 A1* | 9/2008 | Landry .................. B64D 47/06 416/5 |
| 2010/0054935 A1* | 3/2010 | Olesen .................. G01B 11/18 416/61 |
| 2011/0150390 A1* | 6/2011 | Meyer ..................... G02B 6/125 385/31 |
| 2016/0178531 A1* | 6/2016 | Nicq ....................... B64C 11/26 356/237.2 |
| 2017/0315021 A1 | 11/2017 | Nicq et al. |

OTHER PUBLICATIONS

CA Office Action for Application No. 3,105,243, dated Mar. 25, 2022; 6 pages.

* cited by examiner

HEALTH MONITORING BASED ON BLADE TIP TRAJECTORY

FOREIGN PRIORITY

This application claims priority to European Patent Application No. 20305160.2 filed Feb. 19, 2020, the entire contents of which is incorporated herein by reference.

FIELD

The present disclosure relates to a propeller blade, a propeller comprising a plurality of propeller blades, a system for monitoring the health of a propeller and a method therefor.

BACKGROUND

Propellers comprise a central rotating hub with a plurality of rotating blades, each mounted to the hub at one end and comprising a blade tip at the other. Each blade comprises a blade body with an airfoil section which creates thrust for an aircraft. As can be appreciated the propeller blades are crucial components of a propeller powered aircraft and therefore it is necessary that they are suitably maintained. Deterioration of the propeller can significantly reduce the operational efficiency of a propeller and the resultant thrust of the aircraft.

Aircraft propellers are therefore routinely checked pre-flight and require regular maintenance. Propellers can become damaged over time due, for example, to high loading during abnormal propeller operations, adverse weather conditions, airborne sand, bird strike or the like. Degradation of the blade can occur leading to a loss of structural integrity.

Pre-flight checks and maintenance are able to identify a damaged blade once the damage has reached a detectable level; however, these pre-flight checks can delay the departure of the aircraft and maintenance may require the aircraft to be grounded for a significant time without advance warning. This can have an effect on the operational efficiency of the aircraft. In most cases, the pre-flight checks will not reveal any damage and so may be regarded as lost expenditure.

There is therefore a need to provide a system which can monitor the health of the blades easily and in real time to assess whether maintenance may be required.

SUMMARY

According to a first aspect, there is provided a propeller blade comprising: a blade body having a hub end and a tip end; and a light source mounted in or on the blade body, the light source being able to emit a light beam from the tip end of the propeller blade.

The light source may be mounted proximate to a tip of the propeller blade.

The light source may be self-powered. The light source may be electrically connected to a piezoelectric device provided within the propeller blade in order to power the light source.

The light source may powered using available power in the propeller blade, optionally wherein the light source is electrically connected to a propeller blade de-icing circuit in order to power the light source.

The light source may be a laser device, optionally wherein the light source is a VCSEL.

According to a second aspect, there is provided a propeller comprising a hub having an axis of rotation and a plurality of propeller blades as set out in the first aspect, wherein the light sources of each propeller blade are each configured to emit a light beam in a direction which radiates outwardly from the propeller hub.

The light sources may each be configured to emit a light beam in a generally radial direction.

The propeller may comprise deicing devices in each of the blade bodies and electrical connections for coupling electrical power to the deicing devices from an electrical power supply.

According to a third embodiment, there is provided a propeller health monitoring system for an aircraft comprising; an aircraft having one or more propellers as set out in the second aspect, wherein the system further comprises one or more receptors mounted to a fuselage and/or a nacelle of the aircraft, each receptor having a sensor surface which is able to detect a position for each light beam crossing over the sensor surface as the propeller rotates, such that the receptor generates a signal that is indicative of the position as a measure of blade tip trajectory for each passing propeller blade, wherein the system further comprises a processing unit which analyses the signals from the receptor to determine health of the propeller blades of the one or more propellers based on where the beams of light from the propeller blades have crossed over the sensor surface.

The propeller health monitoring system may comprise a processor that processes that signal to determine a state of health of a propeller blade associated with the signal.

The processor may determine a value for a trajectory of a blade tip of the propeller blade being observed.

The processor may compare the value to a threshold value and/or to a value for another propeller blade of the same propeller or different propeller.

According to a fourth aspect, there is provided a method of monitoring the health of a propeller of an aircraft, the propeller comprising a hub having an axis of rotation and a plurality of propeller blades, each propeller blade comprising a blade body having a hub end and a tip end and a light source mounted in or on the blade body, the light source being able to emit a light beam from the tip end of the propeller blade; wherein the method comprises: detecting, at a receptor comprising a sensor surface on a fuselage and/or nacelle of the aircraft, a position of the light beam crossing over the sensor surface as the propeller rotates; generating a signal indicative of the position as a measure of blade tip trajectory for each passing propeller blade, and analysing the signals to determine health of the propeller blades of the propeller based on where the beams of light from the propeller cross over the sensor surface.

The method may further comprise the step of determining a value for a trajectory of a blade tip of a propeller blade being observed.

The method may further comprise the step of comparing the value to a threshold value and/or to a value for another propeller blade of the same propeller or different propeller.

BRIEF DESCRIPTION OF FIGURES

Certain embodiments of the disclosure are described below by way of example only and with reference to the accompanying drawings, in which.

DETAILED DESCRIPTION OF FIGURES

Figure 1:
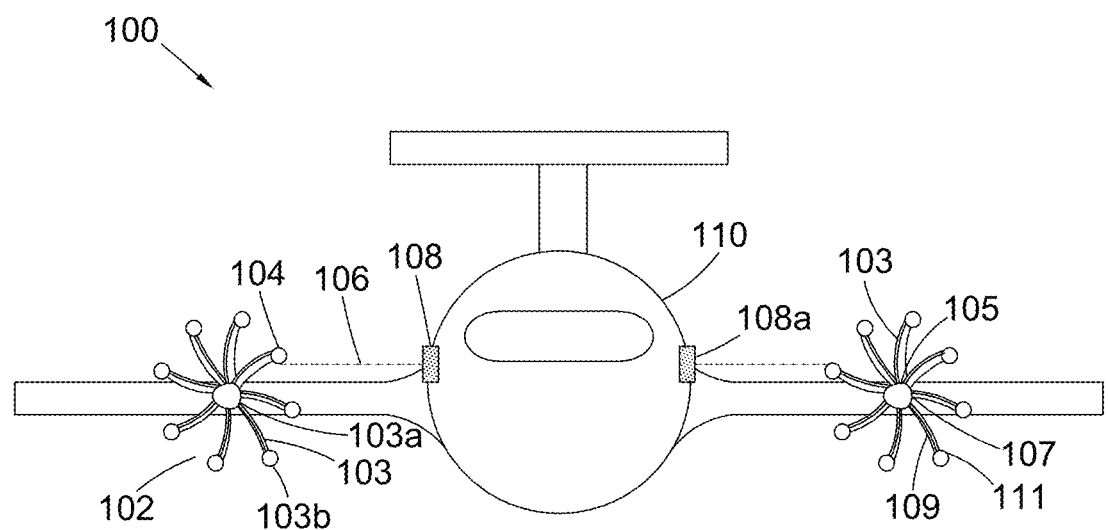
FIG. 1 shows a propeller health monitoring system for an aircraft.

FIG. 1 shows a schematic diagram depicting a propeller-powered aircraft 100 where a propeller 102 is located on each wing of the aircraft. Each propeller 102 comprises a plurality of propeller blades 103. In the embodiment shown in FIG. 1 the propeller 102 comprises 8 propeller blades 103, however it will be appreciated that different numbers of propeller blades are possible. For example the propeller may comprise 2, 3, 4, 5 or 6 propeller blades, or more.

The propeller 102 may be any type of propeller. It could include, for example, a ducted propeller, an open rotor prop fan engine, a pair of contra rotating co-axial propellers or counter rotating propellers.

Each propeller comprises a hub 105 which the propeller blades 103 are mounted to. The propeller blade 103 may be integrally formed with the hub 105, alternatively the propeller blades 103 may be mounted to the hub 105 separately.

The propeller blades 103 therefore each comprise a hub end 103a and a tip end 103b. The hub end 103a may comprise a blade root 107 for attachment to the hub 105 of a propeller 102, an airfoil section or blade body 109 which extends generally between the hub end 103a and the tip end 103b, and a blade tip 111 at the radially outermost point of the propeller blade 103. The propeller blade may comprise a fibre reinforced composite material.

The aircraft 100 shown in FIG. 1 is provided with two propellers 102, however it will be appreciated that additional propellers may be present. For example the aircraft 100 could comprise four propellers 102, i.e. two on each wing, or more than four propellers. Alternatively, the aircraft 100 may only comprise a single propeller 102, for example, a rear facing propeller, where the propeller 102 is arranged between parts of a fuselage that extend beyond the propeller to support a tail section.

In operation, the propellers 102 of an aircraft 100 may become damaged due to, for example, high loading during abnormal propeller operations, adverse weather conditions, airborne sand, bird strike or the like. This can have an effect on the structural integrity of a propeller blade, in particular, making the propeller blade less rigid, and so it is necessary to perform regular maintenance checks on the propellers to check for such damage. These maintenance checks require the aircraft to be grounded which has a significant effect on the running costs of the aircraft.

It is therefore desirable to provide a system and method that allows the health of the propeller blade to be monitored during flight in order to determine whether a maintenance check might be necessary. This may help to avoid maintenance being scheduled when it is not required. It may also allow degradation to be detected sooner, allowing for pre-ordering of replacement parts and prescheduling the maintenance.

In FIG. 1, each of the propeller blades 103 of the propeller 102 is fitted with a light source 104. The light source 104 is fitted to the tip end 103b of each propeller blade 103 as shown; in particular it may be fitted to the actual blade tip 11 of each propeller blade 103.

The light source may be embedded in a transparent resin within the blade body.

By "tip end" 103b of the propeller blade 103, it is meant the portion of the propeller blade 103 that is positioned adjacent to and includes the blade tip 11, for example, where the pressure and suction surfaces are converging (e.g., the blade thickness is reducing) in a spanwise/radial direction. It may be viewed as representing the tip-most third of the propeller blade, for example, and perhaps more precisely the last 20% of the propeller blade 103 moving in a spanwise direction from the interface position of the hub end 103a of the propeller blade 103 with the hub 105 along the blade body 109 to the blade tip 11.

Each light source 104 is fitted to the propeller blade 103 such that it is configured to emit a light beam 106 in an outwardly, generally radial direction of the propeller 102. In this way, the light beam 106 can project a blade tip trajectory of the propeller blade 103 onto another part of the aircraft 100, such as the fuselage or a nacelle, where a receptor 108 is mounted to detect the light beam 106 as the propeller rotates and the light beam 106 crosses over the receptor 108.

Figure 2:
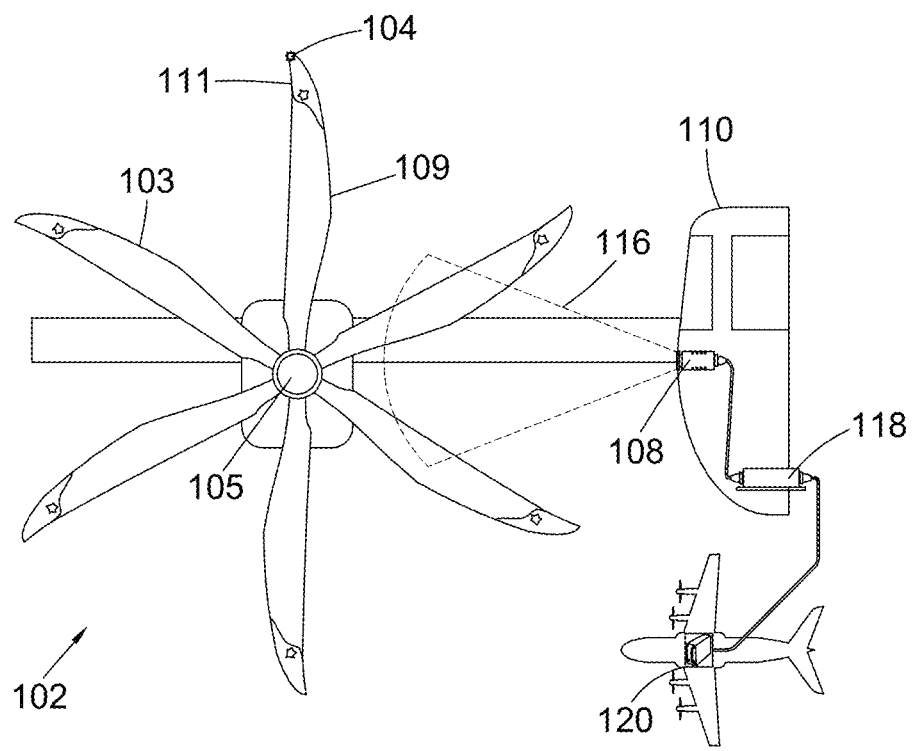
FIG. 2 shows a propeller health monitoring system of an aircraft.

As shown in FIG. 2, the field of view 116 for the receptor 108 may vary in the up-down direction. For example, the field of view 116 may be in a range ±30°, optionally in the range of ±20°, further optionally in the range of ±10°. This allows the receptor 108 to monitor the path of the light beam 106 over a determined distance range. Although not shown in FIG. 2 the field of view 116 of the receptor 108 may also vary by the same range of values in the fore-aft direction.

The radial direction of the propeller 102 is the radial direction of the disc-shaped envelope traced by a blade tip 111 during one complete rotation of the propeller 102 when no forward or aft loads are present. During operation, the propeller 103 will also experience loading due to thrust, e.g., during take-off or a steep climb, or resistance, e.g., during landing or a dive, and this will cause the blade tip trajectory of the propeller blade to alter with flight conditions. As the blade flexes and the blade tip trajectory is moved forward and aft during the flight conditions, the light beam 106, and the path where it traces over the neighbouring surfaces of the aircraft, such as the fuselage or a nacelle, will also be displaced forward and aft in an amount proportional to the change in blade tip trajectory. Thus, by using the displacement of the light beam 106, a measure of the change in blade tip trajectory can be gauged and this can be used to assess the health of the propeller blades 103, since deteriorating or unhealthy propeller blades 103 will have lost some of their original stiffness and will exhibit a greater amount in the blade tip trajectory with different operational conditions.

The light beam configured to be emitted in a generally radial direction such that the precise direction may vary by ±20° in a circumferential direction and ±20° in an axial (forward-aft) direction.

It will be appreciated that the light source 104 can be located anywhere in or on the tip end 103b of the propeller blade 103, provided that the light beam 106 is not obscured in an outwardly, generally radial direction. In other words, there should be a clear line-of-sight to the receptor 108 so that the receptor 106 can register the light beam 106. For example, while the blade tip 111 may be the most appropriate position for the light source 104 so that the full blade tip movement is observed, the light source 104 could also be located in or on the blade body 109 in a position spaced from the actual blade tip 111 but at a location which can still observe flexure within the propeller blade 103, since this will still provide a measure of the blade flexibility when changes are seen in blade tip trajectory.

The light source 104 can be any device able to transmit a light beam, for example it may be a laser device or other type of light source that can generate a narrow, well-defined signal response in a receptor 108 as the light beam crosses over a sensor surface of the receptor. In one example, the light source is a light emitting diode (LED) or a laser diode such as a vertical-cavity surface-emitting laser (VCSEL).

To account for change in angle caused by the change in pitch of the blade 103 of the propeller 102 a resin plotted light emitter can be used to maintain a constant flux intensity level.

In FIG. 1 two optical receptors 108 are located on the outer surface of the fuselage 110, each receptor 108 having a sensor surface 108a which faces outwardly to a propeller 102 and has a clear line-of-sight of the light sources 104 of an adjacent propeller as the tip ends 103b of the propeller 102 pass round. The optical receptors 108 are located in a way so that they face, and are generally level with a portion of, each propeller 102. They may be arranged on a surface of the fuselage or a nacelle that is arranged generally perpendicular to the incident light beam 106 as it crosses over the sensor surface; however it does not need to be exactly perpendicular and angles of 20° or even up to 30° from the perpendicular may still produce acceptable readings. There may be an equal number of optical receptors 108 as there are propeller 102.

In the two engine aircraft 100 of FIG. 1, there are two receptors 108 mounted on the fuselage 110, one on each side of the aircraft 100. In aircraft with four engines, the light sources 104 of the propeller blades 103 on the outboard propellers may be blocked from the optical receptors 108 mounted on the fuselage due to the inboard propellers. In this case, the optical receptors 108 for the outer propellers can be mounted on a nacelle of the inboard propellers on a side of the nacelle facing the outboard propeller.

Each receptor 108 may be mounted on the fuselage 110 or nacelle so that it is generally at the same distance from the nose of the aircraft 100, in a longitudinal direction of the fuselage, as the corresponding propeller 102. The receptor 108 must have a portion of a sensor surface 108a arranged to detect the light beam 106 during a rotation of the propeller 102, e.g., the light beam 106 should cross over the sensor surface 108a of the receptor 108 during each rotation of the propeller 102 if it is to be detected. However, the exact longitudinal position of the receptor 108 will depend on the mounting position of the light source 104 with respect to the blade body 109 of the propeller blade 103 and the direction that the light source 104 is configured to emit the light beam 106 in. For example, there might be a degree of fore or aft inclination in where the light beam 106 is shone from a truly radial alignment. The positioning will also depend on the separation of the light source 104 and the receptor 108 during detection, since this can amplify the displacement.

The receptor 108 is used to assess change in the blade tip trajectory during flight conditions. The receptor 108 may be positioned and have a sensor surface 108a so that it is capable of detecting a light beam 106 from a propeller blade 103 through a complete range of flexure from the position the light beam 106 strikes when the propeller blade 103 is healthy, during a full range of possible operating conditions, through to where the light beam 106 might strike when the propeller blade 103 has degraded from its manufacturing condition and is exhibiting a higher degree of flex.

It is also conceived that the receptor 108 and its sensor surface 108a may be arranged to only detect the light beam 106 when the propeller blade 103 is in a healthy condition, and the absence of a signal from the receptor then indicates that the propeller blade 103 has degraded too far. Equally the receptor 108 and the sensor surface 108a may be arranged to only detect when the propeller blade 103 has reached a threshold level of degradation, and an absence of a signal then indicates that the propeller blade 103 is healthy. The receptor 108 could also comprise a plurality of sensors providing a plurality of sensor surfaces 108a. The plurality of sensor surfaces 108a could be used to detect different amounts of deflection.

In order to avoid any disturbances the light emission can be outside of the human visible spectrum. This reduces the risk to the passengers on board the aircraft, in particular it reduces the damage that may be caused to their eyes.

The receptor 108 wavelength sensitivity can account for shift in the emitter wavelength due to the atmospheric conditions.

The type of light source can change depending on the application of the aircraft. For example, infrared light might not be used in military application that requires the use of Night Vision Systems.

The receptors 108 and light sources 104 may comprise de-icing capabilities. This prevents ice formation which can block or distort the emitted light beam which may lead to a corruption of the results.

Figure 3:
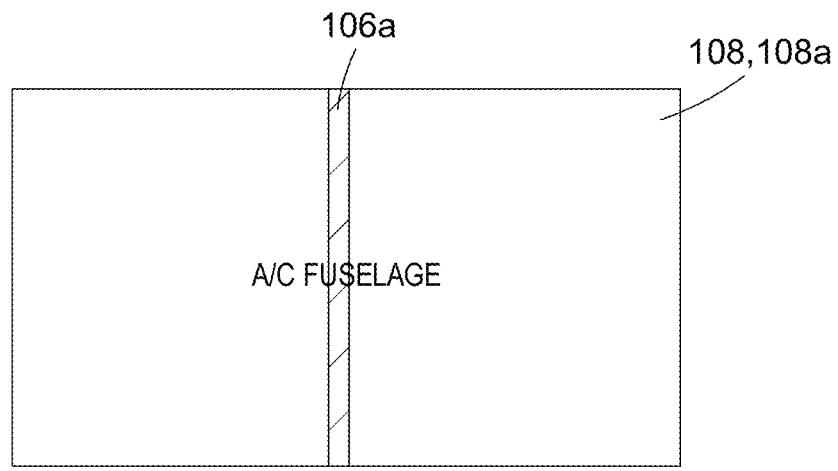
FIG. 3 shows a receptor for use in a propeller health monitoring system when a healthy propeller is observed.

In operation, as the propeller 102 rotates, the light beam 106 associated with each blade tip 111 is detected by the associated receptor 108 and a position is recorded. FIG. 3 shows the sensor surface 108a of the receptor 108 with a trace 106a indicated of where the light beam 106 crosses over the sensor surface 108a during a rotation of the propeller 103. The trace 106a will be present as a line running perpendicular to an axis of rotation of the propeller 103, which follows a trajectory drawn down the height of the receptor 108.

The trace 106a shown in FIG. 3 provides a representation of the blade tip trajectory of a healthy propeller blade 103, and is preferably positioned towards the middle of the sensor surface 108a during normal flight conditions.

In a healthy propeller 102, every healthy propeller blade 103 will have generally the same structural properties (subject to usual manufacturing tolerances and flight hours accrued by the part). The propeller blades will also generally experience the same load configurations during operation; hence all the propeller blades 103 should exhibit a generally equal amount of deflection in the blade tip trajectory during a rotation of the propeller 103 under a given set of flight conditions. The traces 106a for each light beam 106, i.e., for all the propeller blades 103, of a healthy propeller 102 can be substantially aligned to provide a single trace 106a as shown in FIG. 3 (assuming that the light sources are all aligned).

Each receptor 108 on the aircraft, for example, on a side of the fuselage or on a side of a nacelle, will observe a similar trace 106a for each light beam 106 as shown in FIG. 3 if the propeller blades 103 of the propellers 102 are healthy.

FIG. 2 shows a detailed view of the propeller health monitoring system comprising where the receptor 108 is connected to a controller 118. The receptors 108 will output a signal on the basis of where a light beam 106 traces across the sensor surface 108a. Image processing of the signal is then utilised by the controller 118 to provide the output shown in FIG. 3 which can provide an indication of any displacement in the blade tip trajectory by detecting a shift in the longitudinal position of the trace 106a (e.g., in a forward or aft direction of the aircraft). A processor 120 of a processing unit receives the output from the controller 118 and can then be used to compare the signal against one or more of: a previously recorded signal for the propeller blade 103, a signal from another propeller blade and/or a theoretical signal or value, to determine the state of health of the propeller blade(s) 103.

Additional controllers 118 and processors 120 can be provided as redundancies in the event of a failure of one or more of the controllers and processors.

Figure 4:
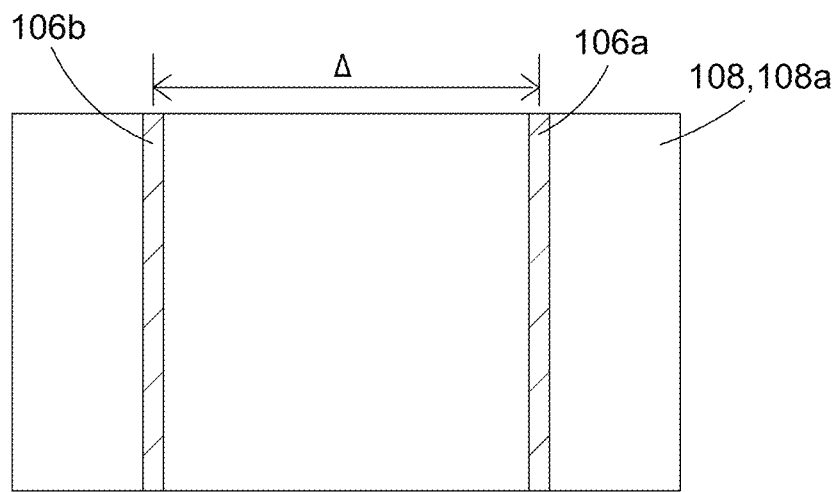
FIG. 4 shows a receptor for use in a propeller health monitoring system when a propeller with a degraded propeller blade is observed.

FIG. 4 shows the trace 106b across the sensor surface 108a of the receptor 108 if one of the blades 103 on a propeller 102 has deteriorated or become damaged. When a propeller blade 103 deteriorates or becomes damaged, its structural properties change, leading to a decrease in stiffness of the propeller blade 103. As a result, under the same loading conditions, a deteriorated or damaged propeller blade 103, e.g., an unhealthy propeller blade, experiences more deflection than a healthy propeller blade 103. This can be measured in terms of a change in the blade tip trajectory for the propeller blade 103. A greater deflection in the blade tip trajectory indicates that the propeller blade 103 may have been damaged in some way or over time, and that an inspection or replacement may be appropriate.

The observed position of a damaged blade may be closer to the tail of the aircraft 100 during certain flight conditions and may be closer to the nose of the aircraft for other flight conditions, depending on whether the forces on the propeller blade 103 are pushing the blade tip aft or forward with respect to the aircraft. The amount of deflection observed will therefore also depend on the operating conditions of the aircraft 100.

Shown schematically, the increased deflection of the damaged blade 103 may cause a separate detected optical trace 106b at a different location on the receptor 108, e.g., at a distance $\Delta$ from the detected optical signal 106a for the health blades 103 of the propeller 102, as indicated in FIG. 4. The distance $\Delta$ is determined by a processor for the receptor or a central processing unit on-board the aircraft 100 which receives data from the optical receptor 108. The distance $\Delta$ corresponds to the difference in the deflection of the damaged blade 103 and hence it may provide a measure of the difference in blade tip trajectory compared to a healthy propeller blade 103.

The propeller blades 103 associated with the output in FIG. 4 relate to the same propeller 102, and so are subject to the same operating conditions. If all the blades 103 were healthy, the output on the receptor 108 would be indicative of the trace 106a as shown in FIG. 3. The separate traces 106a, 106b indicate a deteriorated or damaged blade 103 may be present.

Each blade 103 of a propeller 102 may be compared to historical values recorded for the propeller blade 103, all the other blades of the same propeller 102, and/or may be compared to a blade 103 which is in a diagonally opposite position on the hub 105.

Alternatively, each propeller blade 103 may be compared to a corresponding propeller blade 103 of another propeller 102 on the aircraft, e.g., a propeller 102 of the opposite wing, a propeller blade 103 that is located at the same hub position for the other propeller, and/or it might be compared to all of the propeller blades 103 of that other propeller, e.g., by an mean value. This may be beneficial in identifying faults where multiple propeller blades 103 of a particular propeller 102 have become damaged.

In another embodiment, the position of the trace 106a for each propeller blade 103 may be compared to a threshold value for the flight conditions.

The propeller health monitoring system may use all or any combination of the above to determine the health of a given propeller blade 103.

In the case of a damaged propeller 102, the output of the receptor 108 may reveal two or more traces 106a, 106b, 106c, 106d caused by the light beams 106 tracing over the sensor surface 108a at different longitudinal positions. During different flight conditions, due to the greater deflection of a damaged or otherwise unhealthy propeller blade 103, the blade tips 111 and hence the light sources 104, can follow different blade tip trajectory relative to the healthy propeller blades 103 depending on the extent of the damage.

Figure 5:
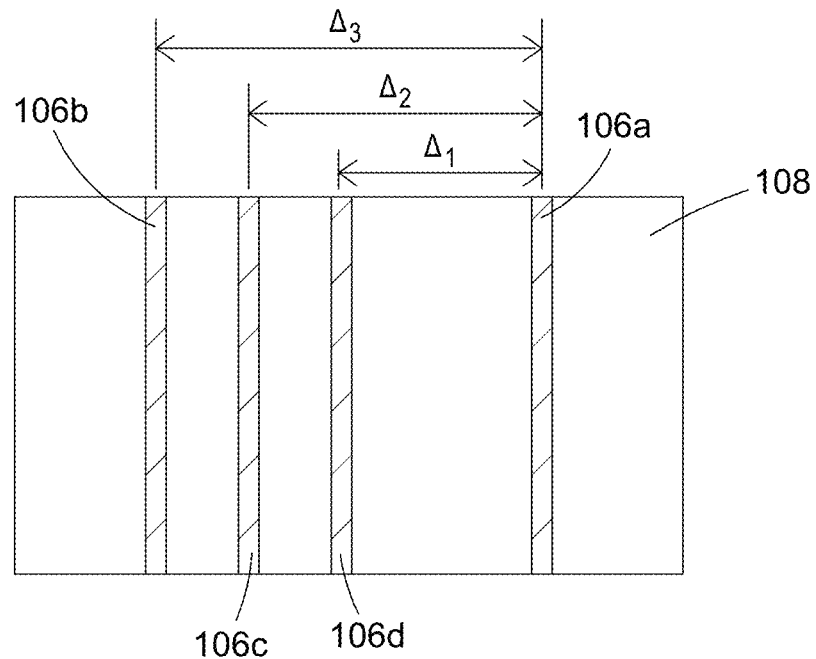
FIG. 5 shows a receptor for use in a propeller health monitoring system when a propeller with several degraded propeller blades is observed.

In the case where multiple blades 103 become damaged or have deteriorated at different rates over time, the output from the receptor 108 may represent a set of traces 106a, 106b, 106c, 106d, each corresponding to a different longitudinal position of where the beams of light 106 from the light sources 104 trace across the sensor surface 108 of the receptor for each of the propeller blades 103. Each damaged blade 103 may be deflect by a different amount during operation, which can lead to multiple traces 106a, 106b, 106c, 106d being received by the receptor 108, e.g., as shown in FIG. 5. The extent of the displacement of the trace 106a, 106b, 106c, 106d may indicate that the damage for some propeller blades 103 may be more severe than others owing to differences in the propeller blade stiffness.

In order to determine whether the additional traces 106b, 106c, 106d are the result of a damaged propeller blade 103, or if it is caused by excess flutter or vibrations, the distances $\Delta_1$, $\Delta_2$, $\Delta_3$ may be assessed over a set number of revolutions and/or compared to a predetermined threshold.

The distances $\Delta_1$, $\Delta_2$, $\Delta_3$ representing the displacement of the traces 106b, 106c, 106d from the healthy trace 106a may be used to predict remaining life of the individual propeller blades 103 and to determine urgency of any maintenance.

If the distances $\Delta_1$, $\Delta_2$, $\Delta_3$ are equal to or greater than a predetermined threshold, the health of the corresponding propeller blade 103 may be impaired.

In the present embodiment, the distances $\Delta_1$, $\Delta_2$, $\Delta_3$ are taken from a trace 106a of a healthy blade 103 of the propeller 102 in order to quantify the deflection in blade tip trajectory, and hence monitor the decrease in blade stiffness; however as stated above, it can be compared to a corresponding propeller blade 103 on another propeller 102 of the aircraft 100 and/or to a predicted value based on a model.

The rotational position of the propeller 103 may be determined by a rotational sensor, for example, from a Np/Beta sensor, so that the timing of the trace 106a crossing the sensor surface 108a can be used to determine which propeller blade 103 the trace 106a represents at any instance.

This also means that if there is any variation in location of the trace 106a in a forward or aft direction of the aircraft due to variations in the positioning of the light source 104 with respect to the propeller blade 103 and the direction that the light beam is emitted in, then this can be accounted for by associating a base distance for a given propeller blade 103. The rotational position can also be used to filter the signals so that the receptor 108 can observe the relative displacement of a trace 106a for a particular propeller blade 103 to determine if that blade is in a healthy or unhealthy condition.

If it is determined that the health of one or more of the propeller blades 103 on an aircraft propeller 102 is impaired, it is necessary to identify the damaged blade. Using data from the Full Authority Digital Engine Control ("FADEC") it is possible to determine, for example, the position of each propeller blade 103 on the hub 105 at any given time and to map that information on to the signals generated by the receptor 108. The light beam 106 that is determined to represent a damaged blade 103 can then be attributed to a specific blade 103 on the propeller 102.

The light beams 106 may also be coded in some way, for example, with a signal which the receptor 108 can read and identify, in order to match the propeller blade 103 to the trace 106a observed on the receptor 108. Alternatively, the light beams 106 may have a different wavelength or colour on each blade 103. The FADEC can therefore determine from the colour/wavelength which blade may be damaged. As another alternative the only one light beam 106 can be emitted at a time allowing the FADEC to determine the deflection of each blade individually.

Typical minimum deflection distances $\Delta_1$, $\Delta_2$, $\Delta_3$ that indicate blade damage can be pre-set in the processing unit and can be any reasonable distance, taking into account any amplification in the observed distance resulting from the flexing of the propeller blade, the separation of the receptor 108 and the angle of incidence of the light beam if not perpendicular. For example, the minimum actual blade tip trajectory deflection might be in the range of 2 mm to 10 mm. This might result in observed deflections in where the light beams 106 trace over the sensor surface 108a of between 20 mm to 100 mm on a reasonably large aircraft.

The presence of a damaged blade 103 may be indicated to the crew of the aircraft and/or an alert for maintenance may be issued. The system can operate in real-time while the aircraft is in operation. Therefore in the event of a propeller blade 103 being damaged, in response to the indication to the crew, the damaged propeller 102 can be shut down. This can help to avoid further damage to the blade 103 or the rest of the aircraft. Previously, when the blades were only inspected at regular intervals, a damaged blade may have been used for further flight hours which could lead to further degradation of the blade and risk of failure.

The system of the present embodiment is further advantageous as it provides a method of real-time monitoring of the health of the propeller. Previously, maintenance may have been carried out on a propeller 102 that is not damaged which would require the aircraft to be grounded unnecessarily which leads to increased running costs of the aircraft. By monitoring the propeller health in real-time, an alert can be triggered if the system determines that propeller blade health may be impaired. Maintenance may therefore only be required if an alert is triggered, thus the time and cost of maintaining the aircraft may be significantly reduced.

Figure 6:
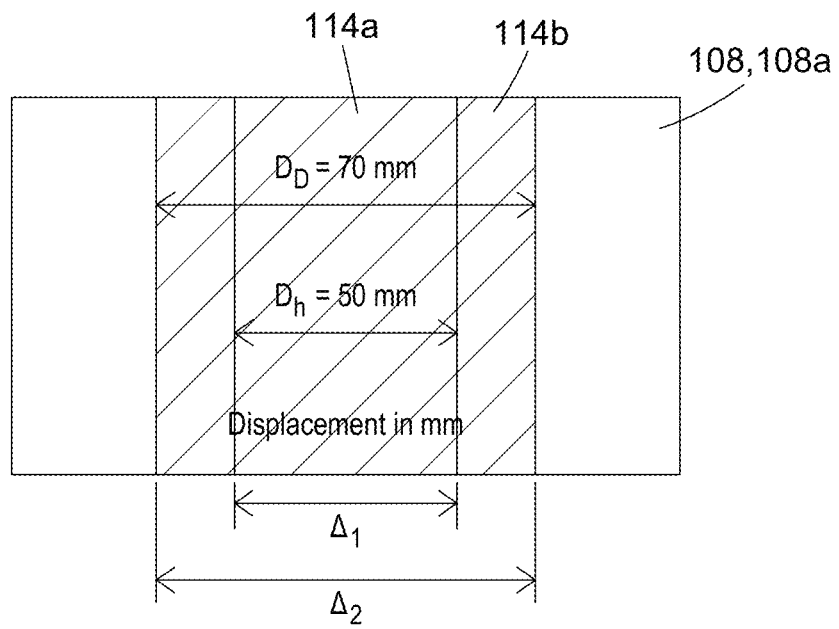
FIG. 6 shows a receptor for use in a propeller health monitoring system during a range of flight conditions.

FIG. 6 shows an alternative system for monitoring the health of the propeller, which uses the same arrangement of transmitters 104 and receptors 108 as shown in FIG. 1. The system shown in FIG. 6 monitors different blades across a range of operating conditions, in contrast with the system shown FIGS. 4 and 5 which is comparing changes in blade tip trajectories for blades at the same operating conditions. Thus FIG. 6 shows a receptor 108 having a sensor surface 108a for detecting beams of light 106 transmitted by the light sources 104. Depending on whether the propeller blades 103 are experiencing an overall loading which is pushing the propeller blades forward or aft, a pre-determined acceptable range 114a on the sensor surface 108a of the receptor 108 can be set and if the detected light beams 106 are received within this acceptable range 114a then the system determines that the corresponding propeller blade 103 is healthy.

If the light beam 106 traces a path that is outside of this acceptable range on the receptor 108, the processing unit may determine that the health of the propeller blade 103 is impaired.

The light beam 106 for the impaired propeller blade 103 may cross the sensor surface on both sides of the area defined by the acceptable range 114a across a range of flight conditions, indicating that the blade tip 111 of the propeller blade 103 is deflected towards the nose and the tail of the aircraft 100 during those conditions.

This embodiment may be beneficial as it is not necessary to compare the received optical signal 106 to that of a corresponding blade at the same operating conditions. This allows results to be provided more readily.

The width of the acceptable range 114a will depend on the separation of the light source and the receptor, i.e., the size and type of the aircraft, and properties of the propeller blade. The width of the observed deflection may, for example be in the range of 10 mm to 80 mm.

The light sources 104 provided on each blade 103 may be powered by a piezoelectric power device provided on the propeller blade which uses vibrations of the blade in operation to generate power for the light source 104.

Additionally or alternatively, the blade may be powered by electrical systems already present in the propeller blades, such as the de-icing system.

The light source 104 may be mounted to the blade by any type of fastening means, for example, by adhesive or fasteners. Alternatively, it may be integrally formed with the rest of the blade, for example, embedded in resin during the construction of the propeller blade.

Figure 7:
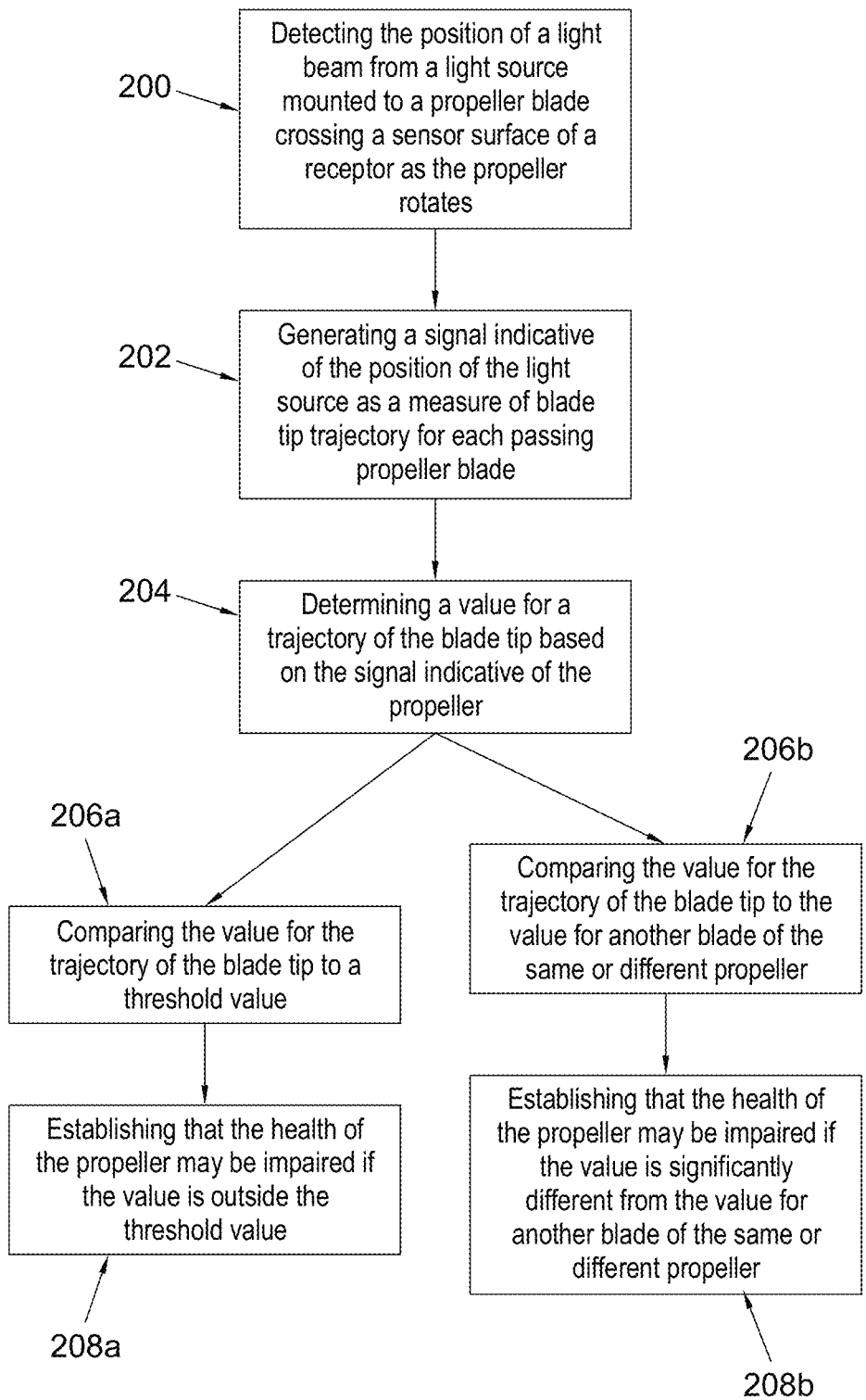
FIG. 7 shows a method for monitoring the health of a propeller.

As set out in FIG. 7, the method of monitoring the health of the propeller using the system described herein comprises, detecting 200 the position of a light beam on a sensor surface of the receptor. The light beam is emitted by one of the light sources mounted on one or more of the blades of the propeller.

The method further comprises generating 202 a signal that is indicative of the position of the light source. The signal is generated by the controller 118 and is used as a measure of the blade tip trajectory as it crosses the sensor surface of the receptor 108. The position of the light source on the sensor surface will differ depending on the deflection of the blade associated with the light source.

The method comprises determining 204 a value for the trajectory of the blade based on the signal generated by the controller 118. The value can be used to provide an indication of the deflection of the propeller blade. This value can then be compared 206a to a threshold value. The threshold value is based on a predetermined maximum deflection of a health propeller blade 103. If the value is outside of the threshold, it is established 208a that the health of the propeller may be impaired.

Alternatively, the method may comprise comparing 206b the value to a value associated with another blade. The other blade may be on the same propeller or a different propeller of the same aircraft. If the value is significantly different from the value associated with the other blade, it is established 208b that the health of the propeller may be impaired.

The present disclosure may also relate to a propeller blade comprising: a blade body having a hub end and a tip end; and a signal source mounted in or on the blade body, the signal source being able to emit a light beam from the tip end of the propeller blade.

As set out above the signal source may be a light source. Alternatively, the signal source may be a magnet capable of interacting with a receptor utilizing the Hall Effect.

The present disclosure may also relate to a propeller health monitoring system for an aircraft comprising; an aircraft having one or more propellers, wherein the system further comprises one or more signal sources and one or more receptors mounted to a fuselage and/or a nacelle of the aircraft. Each receptor having a sensor surface which is able to detect a position of the signal emitted by the signal source crossing over the sensor surface as the propeller rotates, such that the receptor generates a signal that is indicative of the position as a measure of blade tip trajectory for each passing propeller blade, wherein the system further comprises a processing unit which analyses the signals from the receptor to determine health of the propeller blades of the one or more propellers based on where the signals from the signal source from the propeller blades have crossed over the sensor surface.

As set out above the signal source may be a light source. Alternative, the signal source may be a magnet and the receptors may be configured to utilize the Hall Effect to determine the position of the signal on the sensor surface of the receptor.

The signal sources may be mounted to the fuselage or the nacelle of the aircraft. If the signal sources are mounted on the fuselage or the nacelle, the receptors may be mounted on the blades of the propeller.

The invention claimed is:

1. A propeller health monitoring system for an aircraft comprising;
   an aircraft having one or more propellers, each of the one or more propellers comprising:
   a hub having an axis of rotation; and
   a plurality of propeller blades, each of the plurality of propeller blades comprising:
   a blade body having a hub end and a tip end; and a light source mounted in or on the blade body, the light source being able to emit a light beam from the tip end of the propeller blade in a direction which radiates outwardly from the propeller hub;
   wherein the system further comprises:
   one or more receptors mounted to a fuselage or a nacelle of the aircraft, each receptor having a sensor surface which is able to detect a position for each light beam crossing over the sensor surface as the propeller rotates, such that the receptor generates a signal that is indicative of the position as a measure of blade tip trajectory for each passing propeller blade; and
   a processing unit which analyses the signals from the receptor to determine health of the propeller blades of the one or more propellers based on where the beams of light from the propeller blades have crossed over the sensor surface in the forward or aft direction of the aircraft.

2. A system according to claim 1, wherein the light source is mounted proximate to a tip of the propeller blade.

3. The system according to claim 1, wherein the light sources are each configured to emit a light beam in a generally radial direction.

4. The system according to claim 1, wherein the propeller comprises deicing devices in each of the blade bodies and electrical connections for coupling electrical power to the deicing devices from an electrical power supply.

5. The propeller health monitoring system according to claim 1, wherein the propeller health monitoring system comprises a processor that processes that signal to determine a state of health of a propeller blade associated with the signal.

6. The propeller health monitoring system of claim 5, wherein the processor determines a value for a trajectory of a blade tip of the propeller blade being observed.

7. The propeller health monitoring system of claim 6, wherein the processor compares the value to a threshold value and/or to a value for another propeller blade of the same propeller or different propeller.

8. A system according to claim 1, wherein the light source is self-powered.

9. A system according to claim 8, wherein the light source is electrically connected to a piezoelectric device provided within the propeller blade in order to power the light source.

10. A system according to claim 1, wherein the light source is powered using available power in the propeller blade.

11. A system according to claim 10, wherein the light source is electrically connected to a propeller blade de-icing circuit in order to power the light source.

12. A system according to claim 1, wherein the light source is a laser device.

13. A system according to claim 12, wherein the laser device is a vertical-cavity surface-emitting laser (VCSEL).

14. A method of monitoring the health of a propeller of an aircraft, the propeller comprising a hub having an axis of rotation and a plurality of propeller blades, each propeller blade comprising a blade body having a hub end and a tip end and a light source mounted in or on the blade body, the light source being able to emit a light beam from the tip end of the propeller blade;
   wherein the method comprises:
   detecting, at a receptor comprising a sensor surface on a fuselage or nacelle of the aircraft, a position of the light beam crossing over the sensor surface as the propeller rotates; generating a signal indicative of the position as a measure of blade tip trajectory for each passing propeller blade, and
   analysing the signals to determine health of the propeller blades of the propeller based on where the beams of light from the propeller cross over the sensor surface in the forward or aft direction of the aircraft.

15. The method according to claim 14, wherein the method further comprises determining a value for a trajectory of a blade tip of a propeller blade being observed.

16. The method according to claim 15, wherein the method further comprises comparing the value to a threshold value and/or to a value for another propeller blade of the same propeller or different propeller.

* * * * *